(12) United States Patent
Sahara

(10) Patent No.: US 8,254,477 B2
(45) Date of Patent: Aug. 28, 2012

(54) OFDM COMMUNICATION DEVICE AND GUARD INTERVAL LENGTH DETERMINING METHOD

(75) Inventor: Toru Sahara, Kanagawa-ken (JP)

(73) Assignee: Kyocera Corporation, Kyoto (JP)

( * ) Notice: Subject to any disclaimer, the term of this patent is extended or adjusted under 35 U.S.C. 154(b) by 724 days.

(21) Appl. No.: 12/376,275

(22) PCT Filed: Aug. 7, 2007

(86) PCT No.: PCT/JP2007/065462
§ 371 (c)(1), (2), (4) Date: Feb. 3, 2009

(87) PCT Pub. No.: WO2008/018470
PCT Pub. Date: Feb. 14, 2008

(65) Prior Publication Data
US 2009/0316812 A1 Dec. 24, 2009

(30) Foreign Application Priority Data
Aug. 10, 2006 (JP) .................................. 2006-218526

(51) Int. Cl.
H04L 27/28 (2006.01)
(52) U.S. Cl. ....................................... 375/260; 375/220
(58) Field of Classification Search .......... 375/316–352, 375/260, 220, 285
See application file for complete search history.

(56) References Cited

U.S. PATENT DOCUMENTS
2003/0147358 A1* 8/2003 Hiramatsu et al. ............ 370/281
2004/0042385 A1 3/2004 Kim et al.
2005/0073971 A1 4/2005 Mukai ........................... 370/328
2005/0237918 A1 10/2005 Asai et al. ...................... 370/203
2005/0276242 A1 12/2005 Goto et al. .................... 370/328

FOREIGN PATENT DOCUMENTS

| JP | 2002345035 A | 11/2002 |
|---|---|---|
| JP | 2002-374223 | 12/2002 |
| JP | 2005110014 A | 4/2005 |
| JP | 2005252886 A | 9/2005 |
| JP | 2005303826 A | 10/2005 |
| JP | 2006-180321 | 7/2006 |
| JP | 2007-158834 | 6/2007 |
| WO | 9965180 A2 | 12/1999 |

OTHER PUBLICATIONS

Das et al., "Variable Guard Interval Orthogonal Frequency Division Multiplexing in presence of Carrier Frequency Offset" Global Telecommunications Conference, 2005. Globecom '05. vol. 5, pp.2937-2941, Nov. 28, 2005.

(Continued)

Primary Examiner — Sam K Ahn
Assistant Examiner — Janice Tieu
(74) Attorney, Agent, or Firm — DLA Piper LLP (US)

(57) ABSTRACT

An OFDM communication device (10) includes: an REF/IF/BR unit (11) for receiving a series of symbols; a frequency fluctuation amount information acquisition unit (21) for acquiring frequency fluctuation amount information that indicates a frequency fluctuation amount of the received series of symbols; and a GI length determination/instruction unit (23) for determining a GI length in accordance with the frequency fluctuation amount information acquired by the frequency fluctuation amount information acquisition unit (21), and instructing a transmission device to transmit symbols with the determined GI length.

2 Claims, 6 Drawing Sheets

OTHER PUBLICATIONS

Extended European search report dated Jun. 8, 2011 for corresponding European application 07792131.0 cites the non-patent literature above.

Extended European search report dated Jun. 8, 2011 for corresponding European application 07792131.0 cites the U.S. patent application publication and foreign patent document above.

* cited by examiner

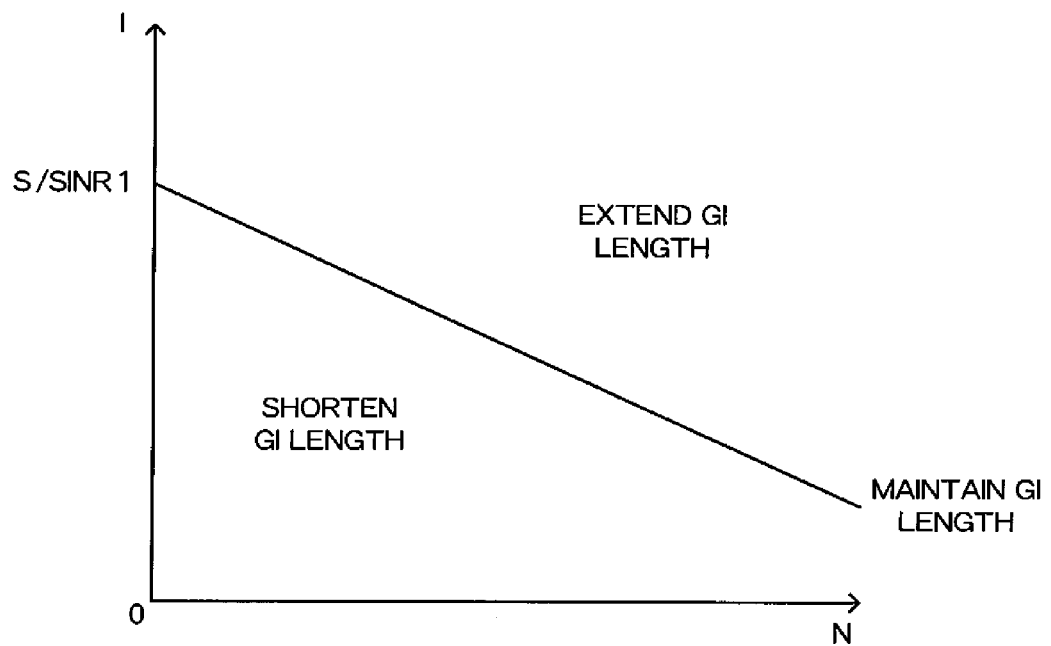

US 8,254,477 B2

OFDM COMMUNICATION DEVICE AND GUARD INTERVAL LENGTH DETERMINING METHOD

TECHNICAL FIELD

The present invention relates to an OFDM communication device and a guard interval length determining method.

BACKGROUND ART

In orthogonal frequency division multiplexing (OFDM), if a certain symbol contains a delay component, the delay component becomes an interference wave against the subsequent symbol, resulting in a decline of a signal to interference and noise ratio (SINR) of the subsequent symbol. In order to prevent this, a guard interval (GI) is provided at the head of the symbol.

In Patent Document 1, there is described a technology of controlling a guard interval length in accordance with an amount of the delay component. In general, the SINR increases as the guard interval becomes longer, but this causes the communication rate to decrease. With this technology, the guard interval length is so determined that a minimum-required SINR can be obtained to maximize the communication rate.

Further, in Patent Document 2, there is disclosed a technology of reducing, in a case where the same sub-carriers are transmitted from a plurality of transmission devices (for example, at the time of handover), interference between symbols that are transmitted from each of the transmission devices. Further, in Patent Document 3, there is disclosed a technology of improving frequency usage efficiency in OFDM.

Patent Document 1: JP 2002-374223 A
Patent Document 2: JP 2005-303826 A
Patent Document 3: JP 2005-252886 A

DISCLOSURE OF THE INVENTION

Problems to be Solved by the Invention

However, the SINR is affected not only by an interference wave (hereinafter, referred to as "symbol delay interference wave") due to the delay component, but also by a frequency fluctuation due to the Doppler effect or the like. Thus, even with the technology described in Patent Document 1, there occur some cases in which a minimum required SINR cannot be obtained.

Specifically, in OFDM, in order to determine a reception timing of a symbol, there is used a known signal. The initial phase of the known signal is known in advance, and hence a communication device on the reception side determines the reception timing of the symbol so that the known signal can be received in a correct initial phase.

However, even if the reception timing of the symbol is determined in this manner, the frequency fluctuation causes the time length of each symbol to be extended or shortened, which results in shift of the phase thereof. This shift acts as noise (hereinafter, referred to as frequency fluctuation noise) when the symbol is received.

The SINR is obtained by dividing a "desired signal" power by an "interference wave and noise" power, and the "interference wave and noise" includes both the "symbol delay interference wave" and the frequency fluctuation noise. Hence, even if the guard interval length is controlled in accordance with the amount of the delay component of the symbol, the minimum required SINR cannot be obtained in some cases.

Therefore, an object of the present invention is to provide an OFDM communication device and a guard interval length determining method, which are capable of controlling a guard interval length so that a minimum required SINR can be obtained even if frequency fluctuation is present.

Means for Solving the Problems

In order to solve the above-mentioned problem, an OFDM communication device according to the present invention includes: a reception unit for receiving a series of symbols; a detection unit for detecting a frequency fluctuation of the series of symbols received by the reception unit; a frequency fluctuation amount information acquisition unit for acquiring frequency fluctuation amount information that indicates an amount of the frequency fluctuation detected by the detection unit; a guard interval length determination unit for determining a guard interval length in accordance with the frequency fluctuation amount information acquired by the frequency fluctuation amount information acquisition unit; and a guard interval length instruction unit for instructing a transmission device to transmit symbols with the guard interval length determined by the guard interval length determination unit.

With this configuration, the guard interval length is determined in accordance with the frequency fluctuation amount information. Hence, the above-mentioned OFDM communication device can control the guard interval length so that the minimum required SINR can be obtained even if the frequency fluctuation is present.

Further, in the above-mentioned OFDM communication device, the series of symbols may contain a known signal portion. The OFDM communication device may further include: a correlation calculation unit for calculating a correlation between the series of symbols received by the reception unit and a held signal that has a waveform identical to a waveform of the known signal portion; a desired signal power acquisition unit for acquiring a desired signal power based on a calculation result from the correlation calculation unit; a symbol delay amount acquisition unit for acquiring a symbol delay amount based on the calculation result from the correlation calculation unit; and a symbol delay interference wave power acquisition unit for acquiring a symbol delay interference wave power, which is an interference wave power in a case where a certain symbol becomes an interference wave against a subsequent symbol, based on the desired signal power acquired by the desired signal power acquisition unit and the symbol delay amount acquired by the symbol delay amount acquisition unit. The guard interval length determination unit may determine the guard interval length in accordance with the frequency fluctuation amount information acquired by the frequency fluctuation amount information acquisition unit and the symbol delay interference wave power acquired by the symbol delay interference wave power acquisition unit.

With this configuration, the guard interval length is determined in accordance with both the frequency fluctuation amount information and the symbol delay interference wave power. Hence, the above-mentioned OFDM communication device can control the guard interval length so that the minimum required SINR can be obtained more preferably even if the frequency fluctuation is present.

Further, in the above-mentioned OFDM communication device, the guard interval length determination unit may include a necessary symbol delay interference wave power calculation unit for calculating a necessary symbol delay interference wave power required for setting an SINR to a predetermined value, based on the frequency fluctuation amount information acquired by the frequency fluctuation amount information acquisition unit. The guard interval length determination unit may determine the guard interval length based on the necessary symbol delay interference wave power calculated by the necessary symbol delay interference wave power calculation unit and the symbol delay interference wave power acquired by the symbol delay interference wave power acquisition unit.

With this configuration, while taking the frequency fluctuation amount information into account, the guard interval length can be so determined that the SINR becomes the predetermined value.

Further, a guard interval length determining method according to the present invention includes: a reception step of receiving a series of symbols; a detection step of detecting a frequency fluctuation of the series of symbols received by the reception unit; a frequency fluctuation amount information acquisition step of acquiring frequency fluctuation amount information that indicates an amount of the frequency fluctuation detected in the detection step; a guard interval length determination step of determining a guard interval length in accordance with the frequency fluctuation amount information acquired in the frequency fluctuation amount information acquisition step; and a guard interval length instruction step of instructing a transmission device to transmit symbols with the guard interval length determined in the guard interval length determination step.

BRIEF DESCRIPTION OF THE DRAWINGS

FIG. 4(a) exemplifies a delay profile illustrating a delay amount for each path in a case of multipath reception of a symbol. FIG. 4(b) exemplifies a "symbol delay interference wave" power.

FIG. 7 is a diagram illustrating a relation between a GI length, and a frequency fluctuation noise power and a "symbol delay interference wave" power according to the embodiment of the present invention.

BEST MODE FOR CARRYING OUT THE INVENTION

With reference to the drawings, an embodiment of the present invention is described.

Figure 1:
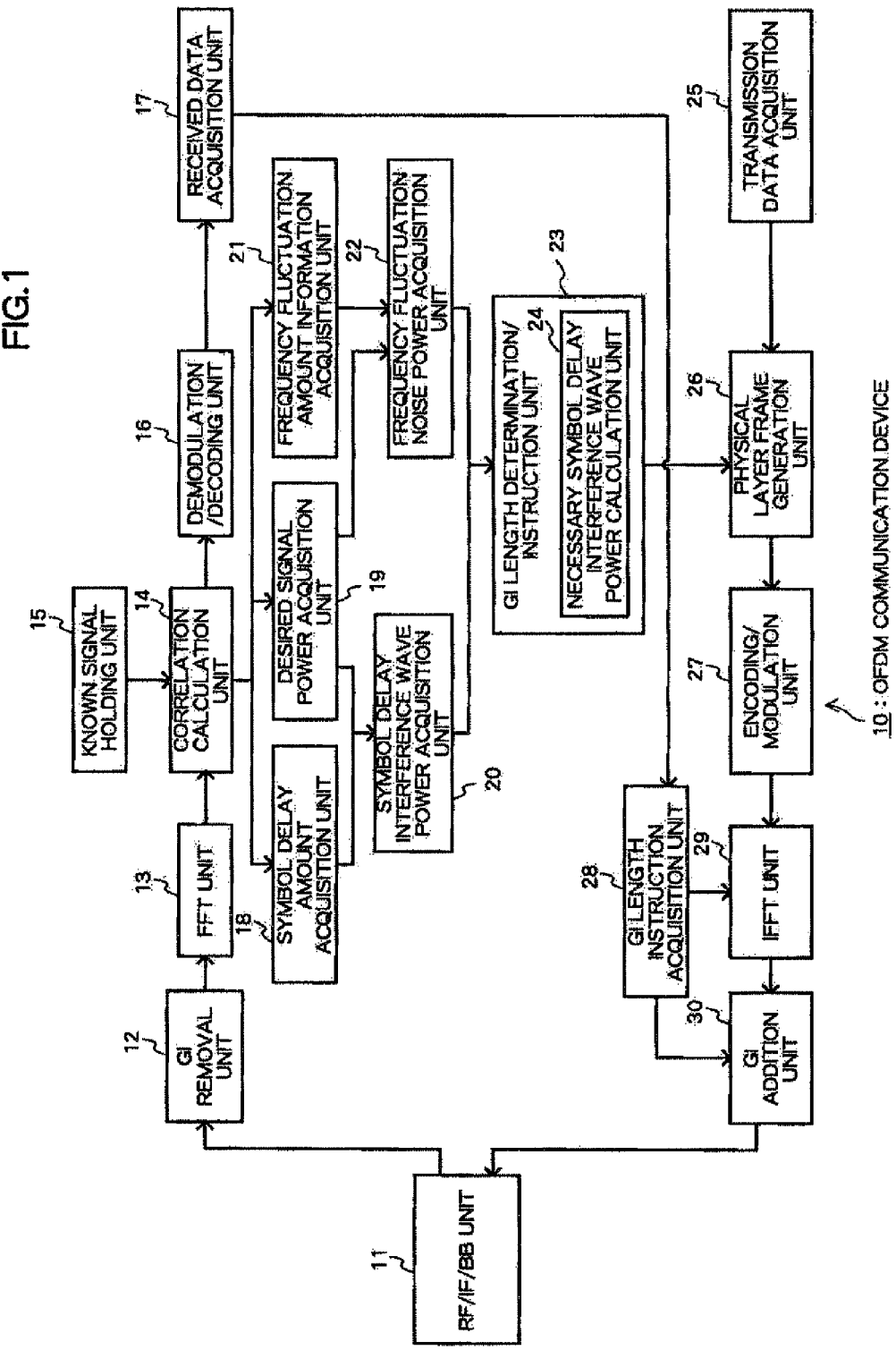
FIG. 1 is a diagram illustrating a system configuration and functional blocks of an OFDM communication device according to an embodiment of the present invention.

FIG. 1 is a diagram illustrating a system configuration and functional blocks of an OFDM communication device 10 according to this embodiment. As illustrated in FIG. 1, in terms of functions, the OFDM communication device 10 includes a radio frequency (RF)/inter-frequency (IF)/base band (BB) unit 11, a GI removal unit 12, a fast Fourier transform (FFT) unit 13, a correlation calculation unit 14, a known signal holding unit 15, a demodulation/decoding unit 16, a received data acquisition unit 17, a symbol delay amount acquisition unit 18, a desired signal power acquisition unit 19, a symbol delay interference wave power acquisition unit 20, a frequency fluctuation amount information acquisition unit 21, a frequency fluctuation noise power acquisition unit 22, a GI length determination/instruction unit 23, a transmission data acquisition unit 25, a physical layer frame generation unit 26, an encoding/modulation unit 27, a GI length instruction acquisition unit 28, an inverse fast Fourier transform (IFFT) unit 29, and a GI addition unit 30. Further, the GI length determination/instruction unit 23 includes a necessary symbol delay interference wave power calculation unit 24.

The OFDM communication device 10 is a communication device used as a mobile station device or a base station device in a mobile communication system, and performs communications by means of OFDM. It should be noted that a communication partner of the OFDM communication device 10 is also a communication device similar to the OFDM communication device 10. Hereinbelow, functions of the above-mentioned respective units that are included in the OFDM communication device 10 are described specifically.

The RF/IF/BB unit 11 receives a radio signal transmitted from the communication partner by means of a super-heterodyne system, and outputs the received signal to the GI removal unit 12.

A description is now made of a radio signal used in OFDM.

Figure 2:
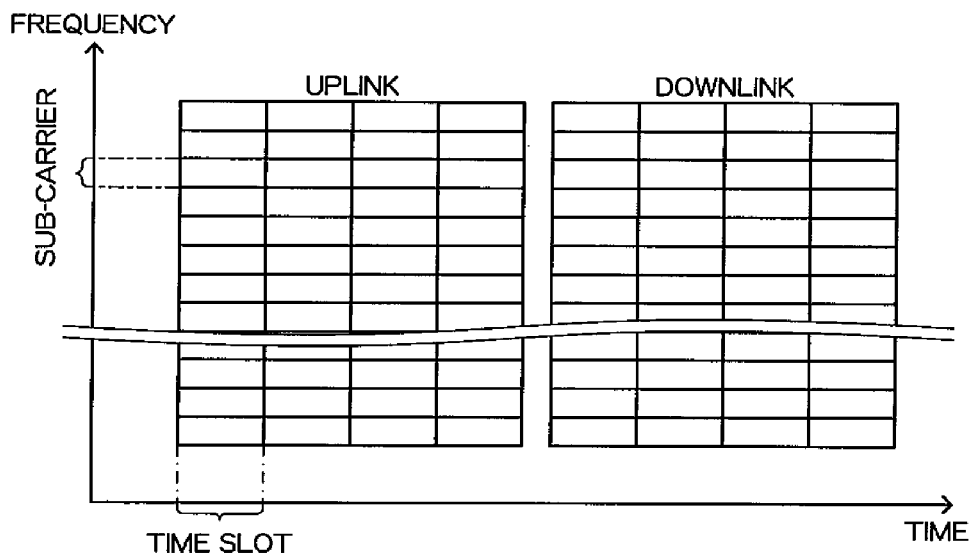
FIG. 2 is an explanatory diagram for describing a radio signal according to the embodiment of the present invention.

FIG. 2 is an explanatory diagram for describing the radio signal used in OFDM. In FIG. 2, the vertical axis represents a frequency axis, whereas the horizontal axis represents a time axis. Individual rectangles represent transmission units of the radio signal. A time length of the transmission unit is equal to a time slot length.

In OFDM, a symbol (signal point indicating data of one or more bits, which is obtained from single modulation) sequence is mapped onto a complex plane for each series of symbols (hereinafter, referred to as unit symbol sequence), the number of which is in accordance with a GI length. After D/A conversion, the mapped symbol sequence is subjected to inverse fast Fourier transform. As a result, the above-mentioned symbol sequence is dispersed among multiple subcarriers on a unit-symbol-sequence basis. The above-mentioned transmission unit is made of the unit symbol sequence thus dispersed.

Figure 3:
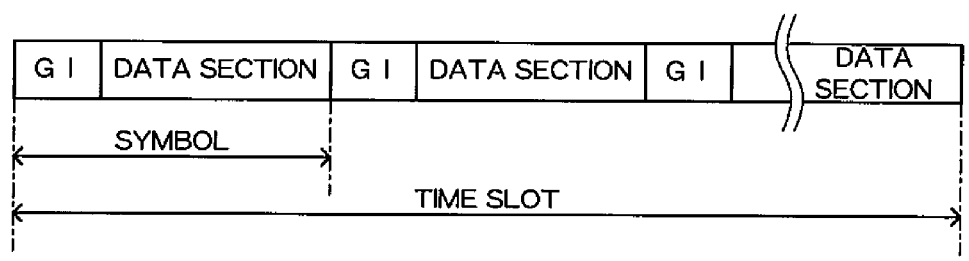
FIG. 3 is an explanatory diagram for describing symbols according to the embodiment of the present invention.

FIG. 3 illustrates a content of the above-mentioned unit symbol sequence in detail. As illustrated in FIG. 3, each unit symbol sequence includes a plurality of symbols, and each symbol includes a GI and a data section. The data section includes an analog signal that indicates a symbol and has a predetermined time length. The GI may be configured to include part (normally, analog signal ranging over GI length from end of data section) of the analog signal constituting the data section, or not to include a significant signal.

The GI removal unit 12 removes the GIs from the radio signal that is input from the RF/IF/BB unit 11, and then outputs the resultant signal to the FFT unit 13.

The FFT unit 13 carries out fast Fourier transform with respect to the radio signal input from the GI removal unit 12. As a result, the FFT unit 13 acquires, for each transmission unit described above, a unit symbol sequence prior to inverse fast Fourier transform, and then outputs the acquired unit symbol sequence to the correlation calculation unit 14. It should be noted that the unit symbol sequence thus acquired includes interference components and noise components.

Here, the above-mentioned unit symbol sequence includes a known signal portion (also referred to as unique word). Further, the known signal holding unit 15 holds a signal having the same waveform as that of this known signal portion. The correlation calculation unit 14 calculates a correlation between the unit symbol sequence input from the FFT unit 13 and a held signal that is held by the known signal holding unit 15 and has the same waveform as that of the above-mentioned known signal. Through this processing, the correlation calculation unit 14 judges that a part showing the largest correlation value is the known signal portion within the unit symbol sequence. Then, the result of the judgment and the unit symbol sequence are output to the demodulation/decoding unit 16.

Here, in some cases, due to the influence of multipath or the like, the above-mentioned unit symbol sequence is dispersed in terms of time, and hence some identical unit symbol sequences are received. Of the unit symbol sequences dispersed in terms of time, unit symbol sequences except for the first one (which is regarded as reception symbol) are all delay components. In a case where such delay components are present, the correlation calculation unit 14 judges that a plurality of portions correspond to the known signal portion.

Figure 4:
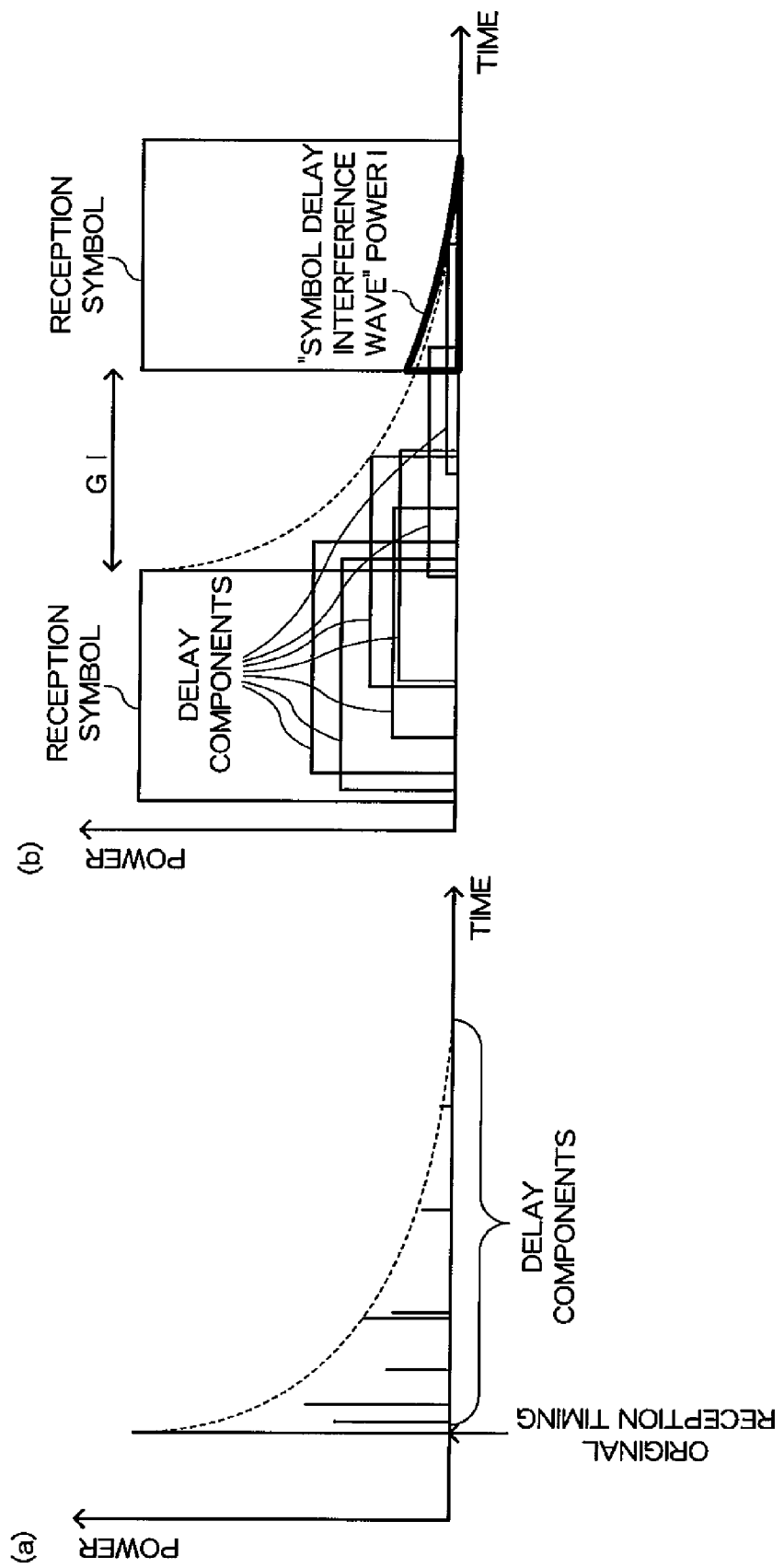
FIG. 4 are diagrams for describing delay of a symbol according to the embodiment of the present invention.

FIG. 4(*a*) exemplifies a delay profile illustrating a delay component for each path in a case of multipath reception of a symbol. As illustrated in FIG. 4(*a*), in the case of the multipath reception, some identical symbols (delay components) which are dispersed at a plurality of slightly different timings are received. It should be noted that, in FIG. 4(*a*), only the reception symbol and the delay components with respect to a single symbol are illustrated, but the degrees of delay for the respective symbols included in a unit symbol sequence can be regarded substantially the same.

The demodulation/decoding unit 16 acquires the reception timing of the known signal portion based on the input result of the judgment. If the above-mentioned delay components are present, the demodulation/decoding unit 16 acquires a plurality of the reception timings. In accordance with the first reception timing of the plurality of the reception timings thus acquired, the demodulation/decoding unit 16 demodulates each unit symbol sequence with a modulation scheme used for modulating each unit symbol sequence concerned. The demodulation/decoding unit 16 further decodes, with a predetermined encoding method, a bit sequence obtained as the result of the demodulation, and then outputs the decoded bit sequence to the received data acquisition unit 17. The received data acquisition unit 17 acquires received data based on the bit sequence that is input from the demodulation/decoding unit 16.

The symbol delay amount acquisition unit 18 acquires the amount of a delay component (symbol delay amount) based on the result of the calculation from the correlation calculation unit 14. Specifically, the symbol delay amount acquisition unit 18 acquires, as the symbol delay amount, the degree of delay for each of the plurality of the delay components.

Further, the desired signal power acquisition unit 19 acquires, based on the result of the calculation from the correlation calculation unit 14, a desired signal power for the reception symbol and each of the plurality of the delay components.

The symbol delay interference wave power acquisition unit 20 acquires a "symbol delay interference wave" power (denoted as I), which is an interference wave power in a case where a certain symbol becomes an interference wave against the subsequent symbol, based on the desired signal powers of the delay components acquired by the desired signal power acquisition unit 19 and the symbol delay amount acquired by the symbol delay amount acquisition unit 18. Specifically, the symbol delay interference wave power acquisition unit 20 acquires the "symbol delay interference wave" power I by summing up the desired signal powers of the unit symbol sequences that have their symbol delay amounts exceeding the GI length.

FIG. 4(*b*) illustrates a specific example of the "symbol delay interference wave" power I. As illustrated in FIG. 4(*b*), the "symbol delay interference wave" power. I represents a power of a portion in which some delay components of a certain symbol that exceed the GI length overlap the subsequent reception symbol.

The frequency fluctuation amount information acquisition unit 21 acquires frequency fluctuation amount information which indicates the amount of a frequency fluctuation of the unit symbol sequence acquired by the FFT unit 13. Hereinbelow, the amount of a frequency fluctuation is described in detail.

The frequency fluctuation refers to a frequency change of a unit symbol sequence, which occurs due to the Doppler effect or the like. In many cases, the frequency fluctuation is frequency selective, and therefore occurs only in some sub-carriers.

Figure 5:
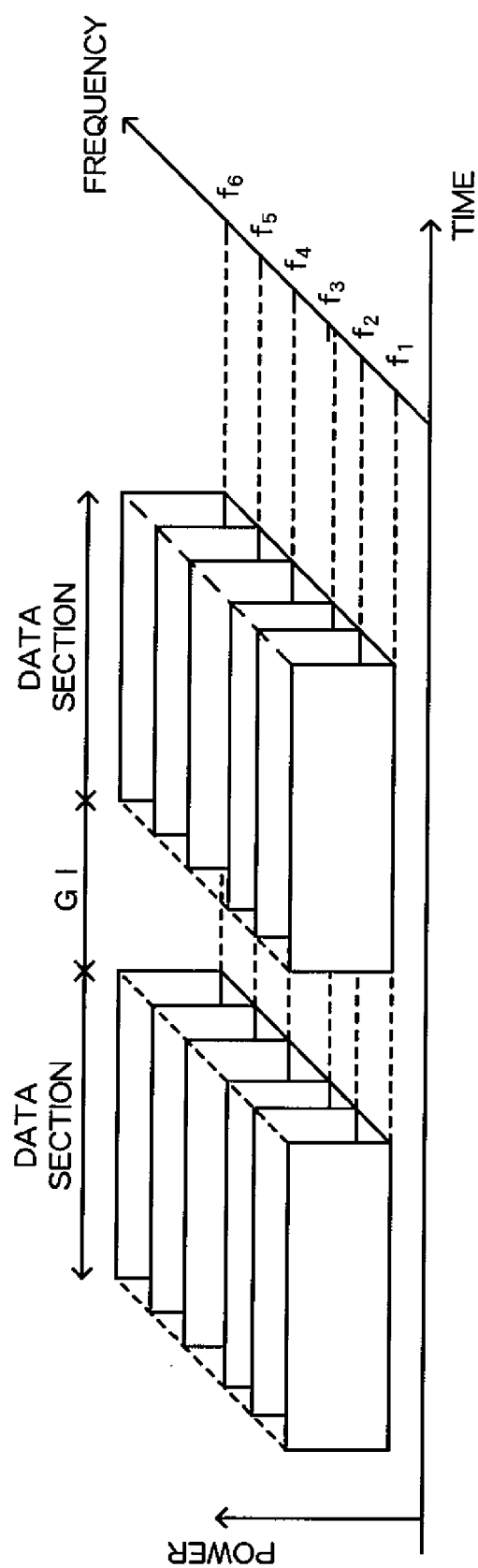
FIG. 5 is a diagram illustrating an example of a frequency fluctuation according to the embodiment of the present invention.

FIG. 5 illustrates a specific example of the frequency fluctuation. In FIG. 5, sub-carriers having frequencies $f_1$ to $f_6$ are illustrated, and the frequency fluctuation occurs in the vicinity of a frequency $f_3$. As a result, the frequency of the sub-carrier originally having the frequency $f_3$ is shifted from the frequency $f_3$.

When such a frequency fluctuation is present, the phase of the reception symbol becomes shifted from the original phase. Specifically, the reception timing of the data section is determined based on the reception timing of the known signal portion acquired in the above-mentioned manner. If the frequency of the signal concerned is not shifted from the original frequency, the phase of that signal received at the above-mentioned reception timing corresponds to the original phase, but if the frequency is shifted, the phase becomes shifted from the original phase because the signal is extended or shortened in the time axis direction. The phase shift error thus generated affects the reception of the symbol as noise (frequency fluctuation noise).

The frequency fluctuation amount information acquisition unit 21 acquires, for each symbol and sub-carrier, a change amount of the phase within a predetermined period of time (e.g., within period for update of GI length), and then acquires the frequency fluctuation amount information based on the acquired change amount of the phase. Specifically, the frequency fluctuation amount information is calculated with the following Expression (1). In Expression (1), m represents serial numbers assigned to symbols within the above-mentioned predetermined period of time (here, 1 to M); k, serial numbers of sub-carriers (here, 1 to K); $\theta_{mk}$, a signal vector angle (phase) in the case of a symbol number m and a sub-carrier number k; $\theta_{mkr}$, an original signal vector angle (phase) in the case of the symbol number m and the sub-carrier number k; and $N_\theta$, the frequency fluctuation amount information. It should be noted that, for $\theta_{mkr}$, a vector average angle within the above-mentioned predetermined period of time, which is obtained after modulation signal components are removed, may be used.

[Expression 1]

$$N_\theta = \frac{\sum_{m=1}^{M}\left(\sum_{k=1}^{K}(|\theta_{mk} - \theta_{mkr}|)\right)}{M \times K} \quad (1)$$

The frequency fluctuation noise power acquisition unit 22 converts, from angle to power, the unit of the frequency fluctuation amount acquired by the frequency fluctuation amount information acquisition unit 21, and then acquires a frequency fluctuation noise power. Specifically, with the following Expression (2), a frequency fluctuation noise power N is acquired. Here, S represents a desired signal power of the reception symbol acquired by the desired signal power acquisition unit 19, and α represents a proportional multiplier determined based on the modulation scheme. For example, in the case of QPSK, based on a maximum phase change ±π/4 [rad], at which the demodulation becomes impossible, α is determined as π/4.

$$N = S \times \alpha \times N_\theta \times (M \times K) \quad (2)$$

The GI length determination/instruction unit 23 determines the GI length in accordance with the frequency fluctuation noise power N acquired by the frequency fluctuation noise power acquisition unit 22 and the "symbol delay interference wave" power I acquired by the symbol delay interference wave power acquisition unit 20.

Specifically, the necessary symbol delay interference wave power calculation unit 24 calculates the necessary "symbol delay interference wave" power $I_{MAX}$ for setting an SINR to a predetermined value (minimum required SINR for establishing communication), based on the frequency fluctuation noise power N acquired by the frequency fluctuation noise power acquisition unit 22. The GI length determination/instruction unit 23 determines the GI length based on the necessary "symbol delay interference wave" power $I_{MAX}$ thus calculated and the "symbol delay interference wave" power I acquired by the symbol delay interference wave power acquisition unit 20. More specifically, the GI length determination/instruction unit 23 determines the GI length such that the "symbol delay interference wave" power acquired by the symbol delay interference wave power acquisition unit 20 becomes equal to the necessary "symbol delay interference wave" power $I_{MAX}$.

After the GI length determination/instruction unit 23 determines the GI length as described above, the GI length determination/instruction unit 23 instructs the communication partner to transmit the symbols with that GI length. Specifically, the GI length determination/instruction unit 23 generates GI length instruction information that specifies the GI length for instruction, and then outputs the GI length instruction information to the physical layer frame generation unit 26. Consequently, the GI length instruction information is transmitted to the communication partner. Hereinbelow, referring to the details thereof, the transmission of the symbols by the OFDM communication device 10 is described.

The transmission data acquisition unit 25 acquires a bit sequence constituting transmission data. The physical layer frame generation unit 26 adds a physical layer header to the bit sequence acquired by the transmission data acquisition unit 25, and then outputs the resultant bit sequence to the encoding/modulation unit 27. At this point, the physical layer frame generation unit 26 puts into the physical layer header the GI length instruction information that is input from the GI length determination/instruction unit 23.

The encoding/modulation unit 27 encodes the transmission data, which is input from the physical layer frame generation unit 26 after the physical layer header is added, with a predetermined encoding method, thereby acquiring encoded data. Further, the encoding/modulation unit 27 modulates the encoded data with a given modulation scheme to generate a symbol sequence, and then outputs the generated symbol sequence to the IFFT unit 29. It is preferable that the modulation scheme used by the encoding/modulation unit 27 for modulating the encoded data be changed as necessary in accordance with the radio condition (reception condition) by employing an adaptive modulation scheme.

The GI length instruction acquisition unit 28 acquires, from the received data acquired by the received data acquisition unit 17, the GI length instruction information transmitted from the communication partner through processing similar to the case of the OFDM communication device 10 concerned.

The IFFT unit 29 determines the number of symbols to be included in a unit symbol sequence based on the GI length instruction information acquired by the GI length instruction acquisition unit 28. In this determination, as the GI length becomes longer, the number of symbols becomes smaller. Then, the IFFT unit 29 divides the symbol sequence input from the encoding/modulation unit 27 into unit symbol sequences, which are then mapped onto the complex plane. After D/A conversion, the IFFT unit 29 executes inverse fast Fourier transform. As a result, the symbol sequence is dispersed among multiple sub-carriers on a unit-symbol-sequence basis. The IFFT unit 29 outputs the signal thus obtained to the GI addition unit 30.

The GI addition unit 30 adds a GI, which has a length determined based on the GI length instruction information acquired by the GI length instruction acquisition unit 28, to the head of each symbol constituting the unit symbol sequence, and then outputs the signal to the RF/IF/BB unit 11.

The RF/IF/BB unit 11 wirelessly transmits the signal that is input from the GI addition unit 30 by means of the superheterodyne system.

With regard to the processing described above, the description therefor is made in more details with reference to a processing flow of the OFDM communication device 10.

Figure 6:
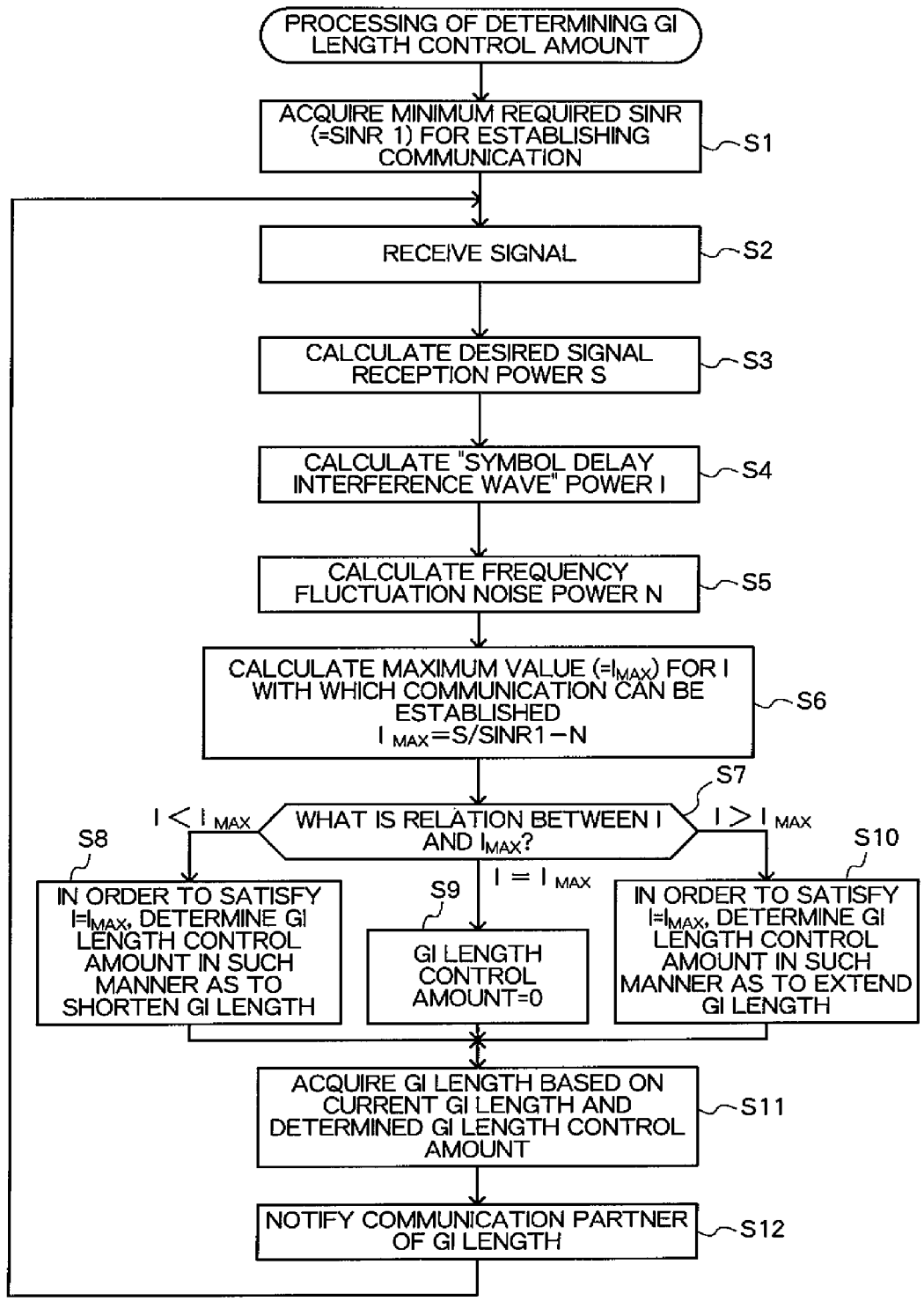
FIG. 6 is a diagram illustrating a processing flow of the OFDM communication device according to the embodiment of the present invention.

FIG. 6 is a diagram illustrating the processing flow of the OFDM communication device 10. As illustrated in FIG. 6, the OFDM communication device 10 first acquires a minimum required SINR for establishing communication. Hereinafter, this SINR is referred to as SINR 1 (S1).

Upon receiving a signal (S2), the OFDM communication device 10 calculates the desired signal reception power S (S3), the "symbol delay interference wave" power I (S4), and the frequency fluctuation noise power N (S5) as described above. After calculating those powers, the OFDM communication device 10 calculates the maximum value $I_{MAX}$ for I, with which communication can be established. In other words, the OFDM communication device 10 calculates the maximum value $I_{MAX}$ for I, which is an allowable value if the frequency fluctuation noise power N is present. Specifically, the maximum value $I_{MAX}$ is calculated with the following Expression (3) (S6).

$$I_{MAX} = S/SINR1 - N \quad (3)$$

The OFDM communication device 10 compares I calculated in S2 and $I_{MAX}$ calculated in S6, and then performs different processing in accordance with its result (S7). When I is smaller than $I_{MAX}$, communication can be established even if I is set larger. Accordingly, in order to make I larger, the OFDM communication device 10 determines, in accordance with a difference between I and $I_{MAX}$, a GI length control amount in such a manner as to shorten the GI length (S8). When I is equal to $I_{MAX}$, the GI length control amount is determined as 0 so as to maintain the current I (S9). When I is larger than $I_{MAX}$, communication cannot be established with the current state. Accordingly, in order to make I smaller, the OFDM communication device 10 determines, in accordance with the difference between I and $I_{MAX}$, the GI length control amount in such a manner as to extend the GI length (S10).

The OFDM communication device 10 determines the GI length based on the GI length control amount thus determined and the current GI length (S11).

FIG. 7 is a diagram illustrating a relation between the GI length thus determined, and the frequency fluctuation noise power N and the "symbol delay interference wave" power I. As illustrated in FIG. 7, even if the "symbol delay interference wave" power I is small, if the frequency fluctuation noise power N is large, the GI length is more likely to be subjected to extending control. Conversely, even if the "symbol delay interference wave" power I is large, when the frequency fluctuation noise power N is small, the GI length is more likely to be subjected to shortening control.

Lastly, the OFDM communication device 10 transmits the GI length instruction information to the communication partner, thereby notifying the communication partner of the GI length (S12). From then on, the communication partner who has received the GI length instruction information starts to transmit a unit symbol sequence having the GI length specified by the GI length instruction information.

As described above, with the OFDM communication device 10, the GI length can be determined in accordance with both the amount of the frequency fluctuation and the "symbol delay interference wave" power. With this configuration, the OFDM communication device 10 can control the GI length so that the minimum required SINR can be obtained even if the frequency fluctuation is present.

The invention claimed is:

1. An OFDM communication device, comprising:
a reception unit for receiving a series of symbols;
a frequency fluctuation amount information acquisition unit for acquiring frequency fluctuation amount information that indicates a frequency fluctuation amount of the series of symbols received by the reception unit; a frequency noise power acquisition unit for acquiring a frequency fluctuation noise power based on the frequency fluctuation amount information acquired by the frequency fluctuation amount information acquisition unit;
a guard interval length determination unit for determining a guard interval length in accordance with the frequency fluctuation amount information acquired by the frequency fluctuation amount information acquisition unit; and
a guard interval length instruction unit for instructing a transmission device to transmit symbols with the guard interval length determined by the guard interval length determination unit;
wherein the series of symbols contain a known signal portion,
wherein the OFDM communication device further comprises:
a correlation calculation unit for calculating a correlation between the series of symbols received by the reception unit and a held signal that has a waveform identical to a waveform of the known signal portion;
a desired signal power acquisition unit for acquiring a desired signal power based on a calculation result from the correlation calculation unit;
a symbol delay amount acquisition unit for acquiring a symbol delay amount based on the calculation result from the correlation calculation unit; and
a symbol delay interference wave power acquisition unit for acquiring a symbol delay interference wave power, which is an interference wave power in a case where a certain symbol becomes an interference wave against a subsequent symbol, based on the desired signal power acquired by the desired signal power acquisition unit and the symbol delay amount acquired by the symbol delay amount acquisition unit, and
wherein the guard interval length determination unit determines the guard interval length in accordance with the frequency fluctuation noise power acquired by the frequency fluctuation noise power acquisition unit and the symbol delay interference wave power acquired by the symbol delay interference wave power acquisition unit.

2. An OFDM communication device according to claim 1, wherein
the guard interval length determination unit comprises a necessary symbol delay interference wave power calculation unit for calculating a necessary symbol delay interference wave power required for setting an SINR (Signal to Interference and Noise Ratio) to a predetermined value, based on the frequency fluctuation noise power acquired by the frequency fluctuation noise power acquisition unit, and
the guard interval length determination unit determines the guard interval length based on the necessary symbol delay interference wave power calculated by the necessary symbol delay interference wave power calculation unit and the symbol delay interference wave power acquired by the symbol delay interference wave power acquisition unit.

* * * * *